Jan. 1, 1924
R. J. LEWIS
TYPEWRITING MACHINE
Filed July 3, 1922
1,479,390
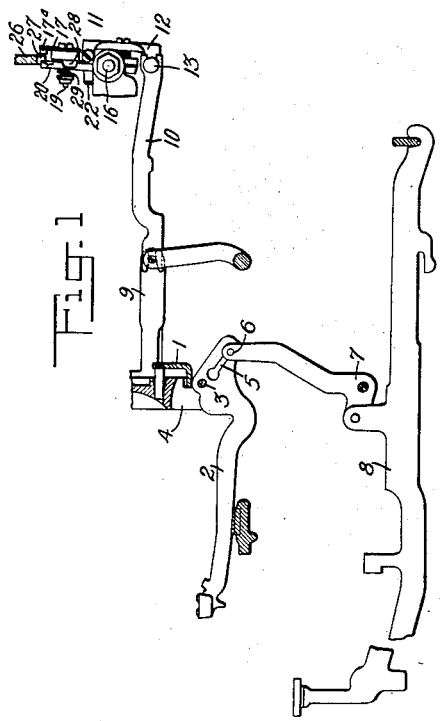
WITNESSES
Inventor
Richard J. Lewis
By his Attorney
Jacob Felbel Patented Jan. 1, 1924.

1,479,390

UNITED STATES PATENT OFFICE.

RICHARD J. LEWIS, OF MOHAWK, NEW YORK, ASSIGNOR TO REMINGTON TYPEWRITER COMPANY, OF ILION, NEW YORK, A CORPORATION OF NEW YORK.

TYPEWRITING MACHINE.

Application filed July 3, 1922. Serial No. 572,453.

*To all whom it may concern:*

Be it known that I, RICHARD J. LEWIS, citizen of the United States, and resident of Mohawk, in the county of Herkimer and State of New York, have invented certain new and useful Improvements in Typewriting Machines, of which the following is a specification.

My invention relates to escapement mechanisms for typewriting and other machines, and has for its main object to provide improved stop devices for the stepping dog, whereby the disagreeable snappy noise heretofore occurring when the stepping dog was spaced forward and arrested may be largely done away with.

To the above and other ends which will hereinafter appear my present invention consists in the features of construction, combinations of devices and arrangements of parts, hereinafter described and particularly pointed out in the claims.

In the accompanying drawings,

Figure 1 is a skeletonized side elevation partly in section and drawn to a reduced scale showing the type action, dog rocker, universal bar and connections employed in the Remington No. 10 typewriting machine to which my invention is herein shown as applied.

Figure 2 is a fragmentary front elevation of a dog carrier or rocker showing my stop invention applied thereto.

Figure 3 is a vertical sectional view taken on a plane indicated by the dotted line 1—1 in Fig. 2 and looking in the direction of the arrow at said line.

Figure 4 is a view corresponding to Fig. 2 but showing the escapement dog in contactive engagement with my improved stop.

Figure 5 is a perspective view of detached parts comprising the novel stop devices.

Figure 6 is a fragmentary view corresponding to Fig. 3 but showing a different stop from the one illustrated in the preceding figures.

Figures 2–6 are drawn to an enlarged scale.

As appears from Fig. 1 the universal bar 1 which is curved in form is actuated by the printing instrumentalities comprising a type bar 2 which is one of a series that contactively engages with the universal bar to move it rearward, the series of type bars being pivoted on a wire 3 mounted on a type bar segment 4, each type bar being provided with a slot 5 engaged by a pin 6 carried by a bell crank 7 which is operated by a key lever 8. The universal bar is operatively connected by a train of devices comprising a rearwardly extending arm 9 and a link 10 with a dog carrier or rocker 11, said carrier or rocker being provided with a downward extension or arm 12 having a pin 13 which is engaged by the slotted rear end of the link 10. The dog carrier or rocker comprises an upstanding portion 14 and a cross portion 15 provided with trunnions formed with depressions which are engaged by stationary pivot pins 16, the pivotal axis of the dog rocker passing through said pivot pins whereon the dog rocker swings fore-and-aft of the machine when actuated. The upstanding part 14 of the dog rocker carries escapement dogs, the rear or rigid dog 17 being adjustably secured to the back of the rocker by screws 18 and 19. The screw 19 is in the form of an elongated screw pin and serves in part to support my novel stop devices as hereinafter appears. The stepping or loose dog is preferably an angular member 20 provided with a tail portion 21 and pivoted at 22 to the front of the upright arm or portion 14 on the dog rocker. The tail 21 of the stepping dog carries a pin 23 over which is hooked the lower end of a coiled spring 24, the upper end whereof is anchored to a pin 25 on the rocker. The spring 24 tends constantly to throw the stepping dog leftward transversely of the machine as viewed in Figs. 2 and 4. Normally the spring 24 is overcome by the carriage main spring of the machine acting through the usual rack member or toothed escapement wheel 26, said wheel through one of its teeth 27 normally engaging with the upper end of the dog 20 and as shown in Fig. 2 maintaining said dog in engagement with the inner face of a stop lug 28 which projects forward from the face of the upright portion 14 of the rocker. When the upper end portion of the dog rocker is rocked forward at printing operation the dog 20 is thereby rocked forward out of the plane of the escapement wheel 26 disengaging from the lowermost tooth thereof, while the rigid dog 17 is swung forward so as to engage said tooth with its beveled portion 17ª. As soon as the dog 20 disengages from the escapement wheel it is swung by its spring 24 on its pivot 22 leftward independently of the dog rocker. In prior constructions the dog 20 has been arrested at the end of its pivotal movement by a solid stop which has resulted in an unpleasant snappy noise.

In order to minimize the noise incident to the arrest of the stepping dog, I have devised new and improved stop devices which provide in effect a spring cushion against which the dog is received and by which it is arrested. As clearly appears from Figs. 2 to 5 my stop devices comprise a stop proper in the form of a coil or spiral 29 of spring wire and two supporting members or devices 30 and 31 for the end portions of the coil. The member or device 30 is in the form of a washer comprising a body portion 32 and a flange 33, a plain hole indicated at 34 running through the washer. The supporting member 31 is in the form of a nut comprising a central flange 35 and cylindrical end portions or hubs 36 and 37 of different diameters disposed at opposite sides of the flange. A threaded hole indicated at 38 extends through the nut. The devices 30 and 31 are mounted on the screw pin 19 near its opposite end portions. The device 30 fits loosely over the pin 19 near its rear end, said device being received in a seat or depression indicated at 39 formed in the face of the part 14 of the dog carrier. The flange 33 is a shade less in diameter than the diameter of the depression so that it may readily bottom in said depression. The nut 31 is threaded on the opposite or forward end portion of the screw pin 19 with the smaller hub or boss 36 facing rearward, and the coiled cushion or spiral spring 29 is arranged between said supporting devices 30 and 31, the coil of wire surrounding the pin 19 and extending lengthwise thereof but being out of contact therewith, the pin passing freely through the coil or spiral. The ends of the spiral 29 abut against the opposite faces of the flanges 33 and 35 and the inner portions of said spiral fit over the cylindrical supporting portions 32 and 36 of the two members, said portions being substantially equal in diameter, the fit of the spiral on the body portion 32 and the hub or boss 36 being sufficiently close to avoid any looseness or lateral lost motion of the spiral 29 on its supports. Obviously by screwing in the nut 31 the spiral may be compressed to increase its rigidity or resisting power and it may be expanded by screwing out the nut. In other words, the devices 30 and 31 are relatively adjustable on the pin 19 to afford proper adjustment and control of the spiral or coiled stop 29. As seen from Fig. 3, it will be apparent that the spiral 29 is arranged with its longitudinal axis fore-and-aft of the machine and transversely of the path of movement of the movably mounted dog 20, so that said spiral will intercept and arrest said dog at the end of its stepping or independent swinging movement around the center 22. The contact portion of the spiral stop, it will further be noted from Fig. 3, is between and clear of its supports 30 and 31, the ends of said supports being outside the planes of the front and rear faces of the movable dog 20. In other words, the dog strikes the coiled stop at a point where the stop is clear of its supports so that the arrest of the dog is effected by the coils alone and the full cushioning effect of the coiled wire spring is obtained, as will clearly be understood from Figs. 3 and 4, Fig. 4 showing the dog 20 in contactive engagement with its stop 29. By this construction the noise of the impact of the dog against its arresting stop is minimized. It will be understood that when the dog carrier swings back from its forward to its normal position the dog 17 will separate from the escapement wheel and the upper end of the stepping dog 20 will enter said wheel, an advancing tooth 27 whereof will engage with said dog overcoming its spring 24 and swinging the dog on its pivot back away from the stop device 29 and into contactive engagement with the stop 28. The dog will thus be swung independently of the dog rocker back from the Fig. 4 to the Fig. 2 position.

It will be apparent that the extent of independent pivotal movement of the dog 20 on its carrier may be varied by varying the diameter of the spiral stop 29. In the Figs. 1-5 construction said stop is of relatively small diameter so that the movement of the dog 20 is proportionately large, this being sufficient to afford what is called ten to the inch spacing, such as is employed when pica type are used.

My present construction provides means for varying the extent of the letter spacing by changing the throw of the dog 20, this being readily effected by substituting for the spiral stop 29 another one of a different diameter, such as is shown in Fig. 6. The spiral stop 40 therein illustrated is of somewhat larger diameter than the spiral 29. At the same time the escapement wheel 26 is replaced by an escapement wheel 41 having its teeth correspondingly closer together, the feed rack and pinion (not shown) being changed at the same time to correspond. In order to replace the stop 29 by the larger stop 40 it is necessary only to unscrew the nut 31, remove the stop 29, replace it by the larger stop 40, and then, reversing the nut 31, to rethread said nut on the pin 19 until the proper relative disposition of the stop supports has been effected, as illustrated in Fig. 6. From said figure it will be noted that when the nut 31 is in reverse position its smaller hub portion 36 is outside and ineffective, while the larger hub 37 has been turned rearward and located in effective position supporting the forward end portion of the stop 40, the fit being sufficiently snug to prevent looseness or rattling of the stop. The diameter of the hub portion 37 is slightly less than that of the circular seat or depression 39 to allow for the thickness of the wire composing the spiral spring, and hence the spring is maintained in a straight, uncramped condition. The rear end portion of the spiral fits snugly in the seat and is supported by the wall thereof, undue looseness of this end of the spiral thus being likewise avoided. In both adjustments it will be observed, more particularly by comparing Figs. 3 and 6, that the ends of the coiled stops abut against the flanges or shoulders 33 and 35. However in the case of the flange 35 its opposite parallel faces alternatively provide abutments for this purpose. As a result of employing the spring cushion or spiral 40 of large diameter the throw of the dog will be lessened as will be understood, the parts being so proportioned that this adapts the escapement for spacing twelve characters to the inch, enabling smaller types, such as what is called elite type, to be employed and providing for more characters to each line of typewritten matter. While it is not necessary, it may be found desirable that the end or point of the screw pin 19 be slightly riveted to prevent the nut or washer 31 from coming off. However, the nut is under pressure due to the re-action of the spring spiral against its flange thus providing an effective check or lock for the nut which assists to maintain it in adjusted positions. The interchangeable construction enables stops of differing diameters to be alternatively employed, one stop being readily substituted for another, the character of the spacing effected by the escapement may be altered with a minimum of work.

A coiled or spiral stop of spring wire such as is provided by my present invention affords a slightly yielding or elastic cushion for the dog which advantageously replaces the solid stop of prior constructions, reducing the noise not only because of the yielding character of the coaction between the two contacting parts, but also by reason of breaking up or interrupting the continuous sound vibrations that occur in a solid body or stop.

While I have described my invention as applied to a dog carrier of the Remington style of construction and as effective to limit the throw of the stepping dog when said dog is released from the escapement wheel, it is of course to be understood that the stop is adaptable for use to arrest different styles of dogs at the end of various characters of movement. In other words, my present invention will be found generally effective as a stop for an escapement or carriage feeding dog on a typewriting machine.

Various changes may be made without departing from my invention.

What I claim as new and desire to secure by Letters Patent, is:—

1. In escapement mechanism for typewriting machines, the combination of a dog carrier, a dog mounted thereon and movable independently thereof, a stop for said dog composed of spring wire normally out of contact with said dog, and adjusting means for affording compression and expansion of said stop.

2. In escapement mechanism for typewriting machines, the combination of a dog carrier, a dog mounted to move independently thereon, a coiled wire spring that acts as a cushion to stop said dog, and means for varying the length of said spring independently of said dog.

3. In escapement mechanism for typewriting machines, the combination of a dog carrier, a dog movably mounted thereon, and a spiral wire spring that acts as a stop for said dog, the dog striking said spring transversely of its length.

4. In escapement mechanism for typewriting machines, the combination of a dog carrier, a dog movably mounted thereon, and a spiral of spring wire that acts as a stop for said dog, the dog contacting with said spiral transversely of its length, said spiral being supported outside of its contact portion.

5. In escapement mechanism for typewriting machines, the combination of a key actuated dog rocker, a rigid dog thereon, a spring pressed stepping dog pivotally supported on said rocker, and a coiled wire spring that acts as a cushion to arrest said stepping dog, said dog contacting directly with the coils of said spring which is arranged across the path of said dog.

6. In escapement mechanism for typewriting machines, the combination of a dog carrier, a dog mounted to move independently thereon, a coil of wire separate from but in the path of said dog to limit its movement, and devices supporting the end portions of said coil at the sides of its stopping face, said devices being relatively adjustable.

7. In escapement mechanism for typewriting machines, the combination of a dog carrier, a dog mounted to move independently thereon, a wire spiral separate from but in the path of said dog to limit its movement, and devices supporting the end portions of said spiral at the sides of its stopping face, said devices being relatively adjustable, said spiral assisting to maintain said devices in relatively adjusted positions.

8. In a typewriting machine, the combination of a key operated pivoted dog carrier that rocks in a fore-and-aft direction, a dog pivoted thereon to swing in a transverse direction, and a spiral stop for said dog arranged fore-and-aft of the machine and in the path of said dog.

9. In escapement mechanism for typewriting machines, the combination of a dog carrier, a dog movably supported thereon, a stop for said dog comprising a spiral independent of said dog, a device on said carrier extending lengthwise through said spiral but out of contact therewith, and supporting members for the end portions of said spiral, both members being mounted on said device at opposite end portions thereof.

10. In escapement mechanism for typewriting machines, the combination of a dog carrier, a dog movably supported thereon, a stop for said dog comprising a spiral, a device on said carrier extending lengthwise through said spiral but out of contact therewith, supporting members for the end portions of said spiral, both members being mounted on said device at opposite ends, and means for affording relative adjustment for said members towards and away fom each other lengthwise of said spiral.

11. In escapement mechansm for typewriting machines, the combination of a dog carrier, a dog movably supported thereon, a spiral stop for said dog, a screw pin on said carrier surrounded by said spiral stop, and a nut threaded on said screw pin and supporting one of the end portions of said stop, said spiral stop operating to hold said nut in adjusted position.

12. In escapement mechanism for typewriting machines, the combination of a dog carrier, a dog movably supported thereon, a stop for said dog comprising a spiral, a screw pin on said carrier surrounded by said spiral, and a nut threaded on said screw pin and provided with a plurality of parts adapted to support the end portions of spirals of varying diameters.

13. In escapement mechanism for typewriting machines, the combination of a dog carrier, a dog movably supported thereon, a stop for said dog comprising a spiral, a screw pin on said carrier surrounded by said spiral, and a nut threaded upon said pin, said nut being provided with circular supporting hubs or bosses of different diameters adapted to support spirals of different diameters.

14. In escapement mechanism for typewriting machines, the combination of a dog rocker, a dog movably supported thereon, a screw pin on said rocker, a nut threaded upon said pin, said nut being provided with circular hubs of different diameters adapted to support stops of different diameters, and a plurality of stops having different diameters and alternatively usable.

15. In escapement mechanism for typewriting machines, the combination of a dog rocker, a dog movably supported thereon, a screw pin on said rocker, a nut threaded upon said pin, said nut being provided with circular hubs of different diameters adapted to support coiled wire stops of different diameters, and a plurality of such stops alternatively usable.

16. In escapement mechanism for typewriting machines, the combination of a dog carrier, a dog movably supported thereon, a stop for said dog comprising a spiral, and a support comprising a screw pin on said carrier, a nut threaded on said screw pin and provided with a plurality of parts adapted to support the end portions of spirals of varying diameters, the opposite end portions whereof are receivable in a depression in said dog carrier.

17. In escapement mechanism for typewriting machines, the combination of a dog carrier, a dog movably supported thereon, a stop for said dog comprising a spiral cushion, a screw pin on said carrier surrounded by said spiral cushion, a nut threaded on said pin, said nut being provided with circular hubs of different diameters for alternatively supported spiral cushions, and a flanged washer loose on said pin and seated in a depression in said carrier, said washer being adapted to support the end portion of one spiral cushion, the wall of the depression being adapted to support a substitute cushion of larger diameter.

18. In escapement mechanism for typewriting machines, the combination of a dog carrier, a dog movably supported thereon, a stop for said dog comprising a spiral, a device extending lengthwise through said spiral but out of contact therewith, supporting members for the end portions of said spiral mounted on said device, and means for affording relative adjustment for said members towards and away from each other lengthwise of said spiral.

19. In escapement mechanism for typewriting machines, the combination of a dog carrier, a dog movably supported thereon, a stop for said dog comprising a spiral, a pin arranged inside said spiral, and flanged members mounted on said pin at its opposite ends, the ends of said spiral abutting the flanges of said members.

20. In escapement mechanism for typewriting machines, the combination of a dog carrier, a dog movably supported thereon, a stop for said dog comprising a wire in spiral form, a pin arranged inside said wire spiral, and flanged members mounted on said pin at its opposite ends, the ends of said spiral abutting the flanges of said members, and said spiral bearing near its ends on the body portions of said members.

21. In escapement mechanism for typewriting machines, the combination of a dog carrier, a dog movably supported thereon, a stop for said dog comprising a spiral of wire, a pin arranged inside the spiral, and flanged members mounted on said pin at its opposite ends and supporting the ends of said spiral, one of said members being reversible to support a spiral of different diameter.

22. In escapement mechanism for typewriting machines, the combination of a dog carrier, a dog movably supported thereon, a stop for said dog comprising a spiral, a device extending lengthwise through said spiral but out of contact therewith, supporting members for the end portions of said spiral mounted on said device, and means for affording relative adjustment of said members towards and away from each other lengthwise of said spiral, one of said members being reversible when the spiral is to be changed for one of a different diameter.

Signed at Ilion, in the county of Herkimer and State of New York this 27th day of June, A. D. 1922.

RICHARD J. LEWIS.

Witnesses:
  LINNIE F. BURNETT,
  E. S. DODGE.